(12) United States Patent
Bianchi et al.

(10) Patent No.: US 7,359,392 B2
(45) Date of Patent: **\*Apr. 15, 2008**

(54) ARCHITECTURE FOR SIGNAL DISTRIBUTION IN WIRELESS DATA NETWORKS

(75) Inventors: Charles H. Bianchi, Strafford, NH (US); Ken C. Greenwood, Hillsborough, NH (US); John Sabat, Jr., Hillsborough, NH (US)

(73) Assignee: ADC Wireless Solutions, LLC, Eden Prairie, MN (US)

( * ) Notice: Subject to any disclaimer, the term of this patent is extended or adjusted under 35 U.S.C. 154(b) by 957 days.

This patent is subject to a terminal disclaimer.

(21) Appl. No.: 10/606,655

(22) Filed: Jun. 26, 2003

(65) Prior Publication Data

US 2004/0057393 A1 Mar. 25, 2004

Related U.S. Application Data

(63) Continuation-in-part of application No. 09/332,518, filed on Jun. 14, 1999, now Pat. No. 6,587,479.

(60) Provisional application No. 60/130,445, filed on Apr. 21, 1999.

(51) Int. Cl.
*H04L 12/66* (2006.01)
(52) U.S. Cl. .................. 370/401; 370/487; 370/490
(58) Field of Classification Search ........ 370/389–405, 370/419–422, 485–490
See application file for complete search history.

(56) References Cited

U.S. PATENT DOCUMENTS

| 4,392,245 A | 7/1983 | Mitama |
| 5,067,173 A | 11/1991 | Gordon et al. |
| 5,129,098 A | 7/1992 | McGirr et al. |
| 5,193,223 A | 3/1993 | Walczak et al. |
| 5,303,287 A | 4/1994 | Laborde |
| 5,321,736 A | 6/1994 | Beasley |
| 5,381,459 A | 1/1995 | Lappington |
| 5,396,484 A | 3/1995 | Itoh |
| 5,421,030 A | 5/1995 | Baran |
| 5,452,473 A | 9/1995 | Weiland et al. |
| 5,463,623 A | 10/1995 | Grimes et al. |
| 5,475,870 A | 12/1995 | Weaver, Jr. et al. |

(Continued)

FOREIGN PATENT DOCUMENTS

EP 0827339 3/1998

(Continued)

OTHER PUBLICATIONS

Anonymous, "IEEE Standard 802.16 Sets Stage for Growth of Metropolitan Area Networks", Microwave Journal, Feb. 2002, p. 51.*

(Continued)

*Primary Examiner*—Hassan Kizou
*Assistant Examiner*—Brian T O'Connor
(74) *Attorney, Agent, or Firm*—Fogg & Powers LLC

(57) ABSTRACT

A distribution network for coupling wireless signals between an internetworking device and a plurality of remotely located access points to provide wireless service within a geographic coverage area composed of microcells. The distribution network makes use of available transport cabling. Examples of such wireless signals include wireless metropolitan area network signals and mobile broadband wireless network signals.

20 Claims, 7 Drawing Sheets

U.S. PATENT DOCUMENTS

| | | | |
|---|---|---|---|
| 5,487,069 | A | 1/1996 | O'Sullivan et al. |
| 5,499,241 | A | 3/1996 | Thompson et al. |
| 5,513,176 | A | 4/1996 | Dean et al. |
| 5,515,014 | A | 5/1996 | Troutman |
| 5,590,173 | A | 12/1996 | Beasley |
| 5,598,412 | A | 1/1997 | Griffith et al. |
| 5,613,190 | A | 3/1997 | Hylton |
| 5,613,191 | A | 3/1997 | Hylton et al. |
| 5,627,879 | A | 5/1997 | Russell et al. |
| 5,636,211 | A | 6/1997 | Newlin et al. |
| 5,768,279 | A | 6/1998 | Barn et al. |
| 5,781,541 | A | 7/1998 | Schneider |
| 5,781,859 | A | 7/1998 | Beasley |
| 5,802,173 | A | 9/1998 | Hamilton-Piercy et al. |
| 5,805,983 | A | 9/1998 | Naidu et al. |
| 5,809,395 | A | 9/1998 | Hamilton-Piercy et al. |
| 5,822,324 | A | 10/1998 | Kostresti et al. |
| 6,122,529 | A | 9/2000 | Sabat, Jr. et al. |
| 6,192,216 | B1 | 2/2001 | Sabat, Jr. et al. |
| 6,205,495 | B1 | 3/2001 | Gilbert et al. |
| 6,223,021 | B1 | 4/2001 | Silvia et al. |
| 6,233,443 | B1 | 5/2001 | Brommer |
| 6,301,240 | B1 | 10/2001 | Slabinski et al. |
| 6,336,042 | B1 | 1/2002 | Dawson et al. |
| 6,349,200 | B1 | 2/2002 | Sabat, Jr. et al. |
| 6,374,124 | B1 | 4/2002 | Slabinski |
| 6,415,132 | B1 | 7/2002 | Sabat, Jr. |
| 6,480,702 | B1 | 11/2002 | Sabat, Jr. |
| 6,513,163 | B1 | 1/2003 | Silvia et al. |
| 6,560,441 | B1 | 5/2003 | Sabat, Jr. et al. |
| 6,584,146 | B2 | 6/2003 | Bose et al. |
| 6,587,479 | B1 * | 7/2003 | Bianchi et al. ............. 370/487 |
| 6,654,428 | B1 | 11/2003 | Bose et al. |
| 6,704,545 | B1 | 3/2004 | Wala |
| 6,785,255 | B2 | 8/2004 | Sastri et al. |
| 6,831,901 | B2 | 12/2004 | Millar |
| 6,876,864 | B1 | 4/2005 | Chapin |
| 6,963,552 | B2 | 11/2005 | Sabat, Jr. et al. |
| 7,069,045 | B2 | 6/2006 | Wu et al. |
| 7,117,015 | B2 | 10/2006 | Scheinert et al. |
| 7,215,651 | B2 | 5/2007 | Millar |
| 2001/0037395 | A1 | 11/2001 | Sabat, Jr. et al. |
| 2002/0016170 | A1 | 2/2002 | Sabat, Jr. et al. |
| 2005/0018630 | A1 * | 1/2005 | Bianchi et al. ............. 370/328 |
| 2005/0018655 | A1 * | 1/2005 | Bianchi et al. ............. 370/352 |
| 2005/0243785 | A1 | 11/2005 | Sabat, Jr. et al. |
| 2007/0147278 | A1 | 6/2007 | Millar |

FOREIGN PATENT DOCUMENTS

| | | |
|---|---|---|
| GB | 2 253 770 A | 9/1992 |
| GB | 2 289 198 A | 11/1995 |
| GB | 2300549 | 11/1996 |
| WO | WO 97/32442 | 9/1997 |
| WO | WO 9829922 | 7/1998 |

OTHER PUBLICATIONS

Anonymous, "IEEE 802.20 Will Set Data Rates Above 1 Mbps for Mobile Users", Microwave Journal, Apr. 2003, p. 57.*

Ayanoglu et al., "Wireless ATM: Limits, Challenges and Proposals", IEEE Personal Communications, Aug. 1996, pp. 18-34, vol. 3, No. 4, Publisher: IEEE.

Boyle, "Freedom to Roam", PC Magazine, Feb. 20, 1996, pp. 175-177, 180-182, 186, 191-192, 196, 198, 200, 202-204.

Chan et al., "Network Architecture and Traffic Transport for Integrated Wirelss Communications over Enterprise Networks", Wireless Networks 3, 1997, pp. 181-194, Publisher: J.C. Baltzer AG, Science Publishers.

Chow et al., "A Multi-Drop In-House ADSL Distribution Network", CC'94 New Orleans, Louisiana May 1-5, 1994, 1994, pp. 456-460, Publisher: IEEE.

Comer et al., "An Architecture for a Campus-Scale Wireless Mobile Internet", Purdue Technical Report CSD-TR-95-058, 1995, pp. 1-12, Publisher: Purdue University.

"Wireless Lan: Proxim Shipping its Low-Cost, Easy-To-Use Symphony Cordless Networking Solution to Home and Soho Customers", Edge: Work Group Computing Report, Oct. 5, 1998, pp. 1-2, Publisher: Edge Publishing.

"Wireless Proxim to Deliver Wireless Lan Connectivity for Microsoft Windows CE 2.0 (Openair 2.4 Standards)", Edge: Work-Group Computing Report, Oct. 20, 1997, p. 11, vol. 8, Publisher: Edge Publishing.

"Wireless: Proxim Wireless Lan Access Points to be Incorporated into Motorola Wireless Thin-Client Solution", Edge: Work-Goup Computing Report, Sep. 1, 1997, p. 1, vol. 8, Publisher: Edge Publishing.

"Wireless: Proxim Announces Token Ring Wireless Lan Access Point; Separately Announces Industry's First Web Browser-Based Wireless Lan Management Tool", Edge: Work-Group Computing Report, Jul. 28, 1997, p. 41, vol. 8, Publisher: Edge Publishing.

"Hardware-Desktop Communications; Winter 1999 Technology Buyer's Guide Special Issue", Fortune Special , Nov. 16, 1998, p. 134, Publisher: Time Inc.

Lan Man Standards Committee, "Part 11: Wireless Lan Media Access Control (MAC) and Physical Layer (PHY) Specifications", IEEE STD 802. Nov. 1997, pp. 1-466, Publisher: IEEE, Published in : New York, NY.

Lansford, "Home RF: Brining Wireless Connectivity Home", Mar. 9, 1999, pp. 1-27, Publisher: Intel Corporation.

Lin, "An Architecture for a Campus-Sized Wireless Mobile Network", Dec. 1996, pp. 1-157, Publisher: Purdue University.

Negus et al., "Home RF and Swap: Wireless Networking for the Connected Home", Mobile Computing and Communications Review, 1998, pp. 28-37, vol. 2, No. 7, Publisher: ACM Sigmobile.

"Home Networking Goes Mainstream", PC World (via Google Groups), Nov. 16, 1998, pp. 13-14, Published in: Las Vegas, NV.

"Proxim Now Shipping Industry's First Cordless Solution for Shared Broadband Internat Access to Home and Soho Customers", http://web.archive.org/web/19990508095349/www.proxim.com/about/pressroom/1999pr/s..., Feb. 22, 1999, pp. 1-3, Publisher: PROXIM, Published in: Mountain View, CA.

Silva et al., "Interworking Dect with Ethernet for Low Cost Wireless Lans", ICUPC '98 IEEE 1998 International Conference on Universal Personal Communications Conference Proceedings, 1998, pp. 727-731, vol. 1, Publisher: IEEE, Published in: New York, NY.

"Symphony - Cordless Networking Product", http://web.archive.org/web/19990508002708/http://www.proxim.com/symphony/products/, May 8, 1999, pp. 1-6, Publisher: PROXIM.

Yan, "Wireless Data", Aspen Technology Summit, Jun. 3, 1998, pp. 1-21.

Zorzi, "Mobile and Wireless Telecommunication Networks", Feb. 18, 1998, No. 1-38, Publisher: Center for Wireless Communications, University of California San Diego.

Estrin et al., "Cable Television Networks as an Alternative to the Local Loop", "Journal of Telecommunications, Networks", 1984, pp. 103-115, vol. 3, No. 2, Publisher: Computer Science Press Inc., Published in: Maryland, US.

* cited by examiner

ARCHITECTURE FOR SIGNAL DISTRIBUTION IN WIRELESS DATA NETWORKS

RELATED APPLICATIONS

This application is a continuation-in-part of U.S. application Ser. No. 09/332,518, filed Jun. 14, 1999 now U.S. Pat. No. 6,587,479, which claims the benefit of U.S. Provisional Application No. 60/130,445, filed Apr. 21, 1999. The entire teachings of the above applications are incorporated herein by reference.

BACKGROUND OF THE INVENTION

The present invention relates generally to wireless metropolitan area network systems and mobile broadband wireless systems, and more particularly to a distribution network for coupling wireless network signals of these systems between centrally located internetworking devices and remotely located access points. Wireless metropolitan area network systems may include systems that are compatible with the Institute of Electrical and Electronic Engineers (IEEE) 802.16 wireless metropolitan area network (MAN) standard. Mobile broadband wireless systems may include systems that are compatible with the IEEE 802.20 mobile broadband wireless network standard.

The most common user applications for personal computers now require a connection to a computer network of some type. Such applications include the viewing of e-mail, sharing of data files, and accessing the Internet and the World Wide Web. Various techniques are used for connecting computers together so that they may send data to and receive data from each other, more or less in real time. Most often this so-called physical layer is implemented using wires and the bits of data to be exchanged are converted into electrical signals that move through the wires. Traditionally, local area networks (LANs) were implemented using privately installed wiring, such as coaxial cable or twisted pair type cable and network adapter circuits. Later, it became possible to construct LANs through the use of the public switched telephone network and modem equipment.

However, networks that use infrared light or radio frequency energy at the physical layer are growing in popularity. For example, wireless metropolitan area networks ("wireless MANs") and mobile broadband wireless networks ("MBW networks") convert the bits of data into radio waves to enable their transmission over the air, which in turn minimizes the need for hard wired connections.

Wireless MANs are applicable where user portability over a large coverage area is important, while mobile broadband wireless applies to wireless links to high speed vehicles. In both cases, deployment requires the added cost of the required wireless network adapters and the associated data backhaul networks. These wireless systems will become more widely recognized as a general purpose alternative for a broad range of business applications as the cost of mobile computing equipment such as laptop computers and personal digital assistants (PDAs) continues to decrease. For example, with a wireless MAN, users can access shared information without first stopping to find a place to plug-in their equipment. In addition, network managers can set up or augment such networks without installing or moving wires around from place to place.

A common type of multi-user MAN utilizes multiple devices referred to as access points each collecting signals from multiple portable wireless devices. The access points collect signals transmitted from personal computers equipped with wireless network adapters, and distribute them over wired physical media to other internetworking devices such as repeaters (hubs), bridges, routers, and gateways, to provide interconnectivity to larger networks. Another type of network uses wireless MANs as wireless backhaul for shorter range wireless LANs or other more distant wireless MANs as part of a wireless mesh network.

The range of a wireless MAN or mobile broadband wireless access point is limited by how far the signals can travel over the air between the access points and the network adapters connected to the PCs/PDAs etc. Physical terrain and manmade physical structures further decrease propagation range even though these wireless signals are designed to survive the interference caused by multipath reflections and scattering.

To extend coverage beyond this limited range, a network of access points with overlapping radio ranges must be located throughout the desired coverage area. These so-called infrastructure wireless MANs and mobile broadband wireless networks are implemented in a manner which is similar to a cellular telephone system. At any given time, a mobile personal computer equipped with a wireless adapter communicates with at least one access point within its receiving range. On the landline side, the access points are interconnected using network-compatible twisted pair wiring such as that which is compliant with the Ethernet/802.3 10baseT or 100baseT standard. The network signals can then be further forwarded to a local- or wide-area network using standard internetworking protocols and devices.

SUMMARY OF THE INVENTION

The present invention provides a simple and low cost architecture for coupling wireless metropolitan area network ("wireless LAN") and mobile broadband wireless network ("MBW network") signals between geographically distributed access points and centrally located internetworking devices. The invention eliminates complexities involved with the deployment of conventionally interconnected systems, which require the computer network-compatible wiring to be extended to each access point directly from an internetworking device such as a bridge, router, or gateway.

The present invention makes it economically efficient to deploy wireless MAN and MBW network equipment in locations where wired network infrastructure is not readily available. In particular, any convenient existing physical wiring, such as may be provided by the existing coaxial cable used to distribute cable television signals, or the existing twisted pair cabling used to distribute standard telephone signals, is used as a physical layer transport medium to interconnect the wireless access points and centrally located network hub equipment.

More particularly, a cable access point (CAP) is associated with each microcell. The cable access point includes access point equipment for communicating with portable computing equipment located within the microcell, such as may be provided in accordance with standard wireless network specifications such as the Institute of Electrical and Electronic Engineers (IEEE) 802.16 wireless MAN standard and 802.20 mobile broadband wireless network standard.

Rather than couple the wire line side of the access point directly through local area network format cabling such as 10baseT or 100baseT, a remote bridge first converts such signals to a convenient transport format. The transport format implemented by the remote bridge depends upon the available cabling.

For example, if the available cabling is a cable television (CATV) plant, the transport signals may be first converted to a digitally modulated format specified by the American National Standards Institute (ANSI) standard T1 or T3 ("T1/T3"). The T1/T3 signal is then up-converted to a carrier frequency suitable for forwarding over the available CATV plant, such as in the range of from 5-750 MHz.

Alternatively, cable modem equipment may be used in place of the frequency translation and bridging equipment.

If the available cabling is twisted pair plain old telephone service (POTS) type wiring, the remote bridge converts the transport signals to a suitable format such as Digital Subscriber Line (xDSL) format.

The transport signals are collected at a central distribution or headend access point (HAP). At this location, a remote bridge then converts the signals from the up-converted T1/T3 or cable modem formats (in the case of CATV plant implementation), or the xDSL format (in the case of the twisted pair implementation), back to the wired local area network format (such as Ethernet/802.3 10baseT or 100baseT). These Ethernet signals are then suitable for coupling to a local area network hub, or other internetworking equipment such as repeaters, bridges, routers, gateways and the like.

As a result, it is not necessary to deploy Ethernet-compatible or other data network cabling directly to the physical location of each access point within the desired coverage area. Rather, the access points may be deployed in configurations wherever there is available cable television wiring or telephone network wiring, without consideration for the cost and/or logistics of deploying local area network compatible cabling.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE PREFERRED EMBODIMENT

Figure 1:
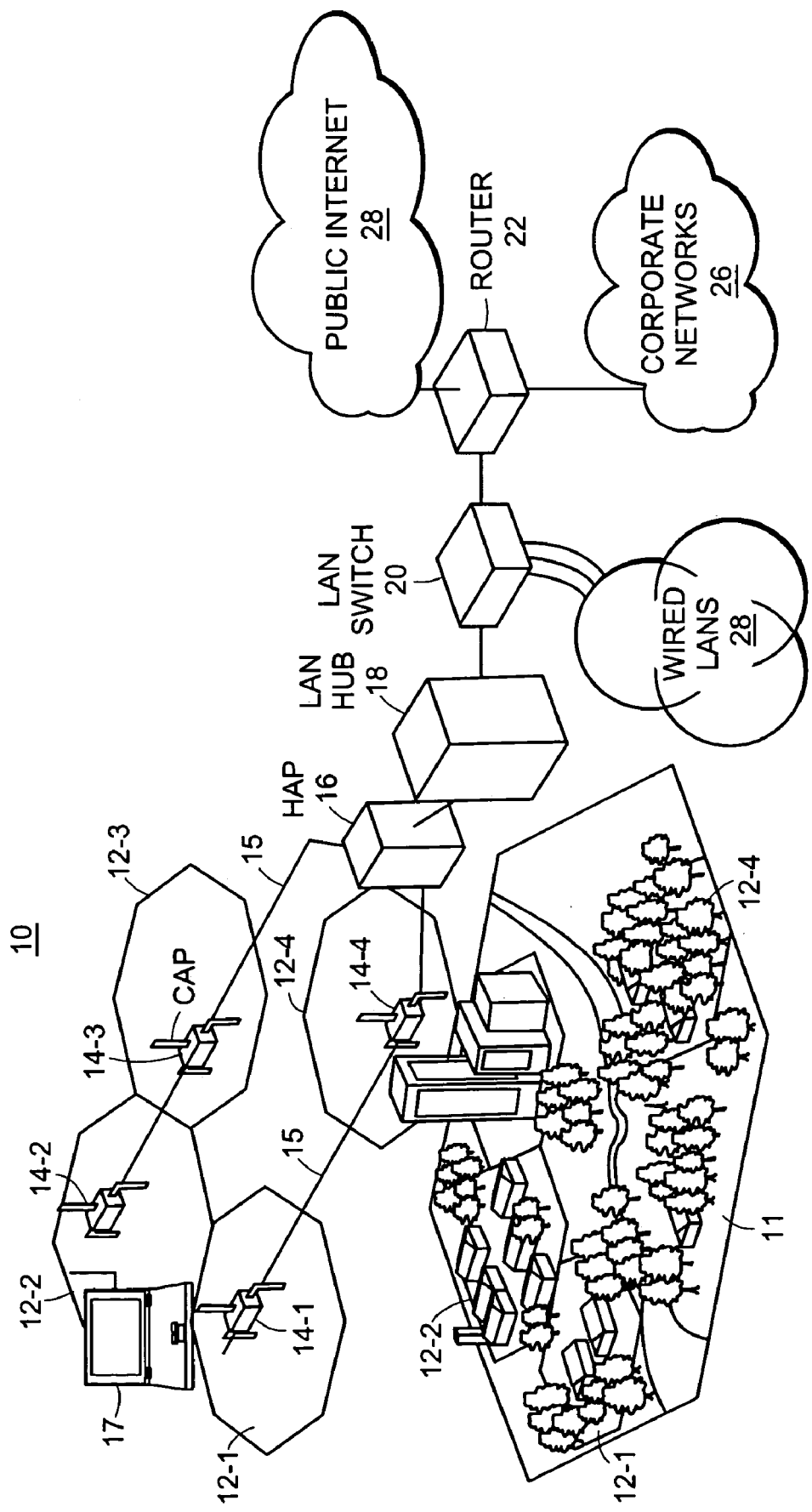
FIG. 1 is a diagram of a system for providing wireless metropolitan area network access using transport cabling according to the invention.

Turning attention now to the drawings, FIG. 1 is a generalized diagram of a wireless data network 10 configured according to the invention. The wireless data network 10 makes use of multiple remotely located wireless metropolitan area network (MAN), or mobile broadband wireless (MBW), access point locations to provide wireless network interconnectivity over a broad coverage area. The wireless data network 10 uses widely available, already installed cabling such as a coaxial cable, optical fiber, or twisted pair as a transport medium. This architecture provides an inexpensive way to deploy wireless MAN or MBW coverage from a centralized internetworking device without the need to distribute MAN or MBW compatible cabling to each access point location in a geographic region 11.

More specifically, the wireless data network 10 consists of a number of microcells 12-1, 12-2, . . . , 12-4 distributed throughout a geographic region. Some of the microcells 12 may be located adjacent to other microcells and located in areas of particularly high population density, such as in an office park. Other microcells 12 may be located in residential and/or rural areas, such as microcell 12-4, and may have no adjacent microcells 12.

The present invention allows the implementation of wireless data network 10 in areas where data network wired backbone infrastructure is not readily available. For example, in the residential or rural area 12-4, such data network infrastructure is not available. Likewise, the invention can be advantageously deployed even in areas such as the office park in microcell 12-3 where such backbone connections may already be available. In this case, the invention provides a way to distribute access points throughout a wide geographic region 11 without the need to provide network connectivity to each access point, such as through leased data lines or other transport media requiring expensive monthly rental payments.

Each microcell 12 has associated with it a corresponding cable access point (CAP) 14-1, 14-2, . . . , 14-4. The cable access points 14 are connected to one another either serially or in parallel via an intercell transport medium 15. It will be understood shortly the transport medium 15 is advantageously selected to be an existing wiring located in the region 11. For example, the transport medium 15 is selected to be a cable television (CATV) cable plant, or twisted pair cabling used to provide plain old telephone service (POTS).

Heretofore, it has been required to provide a high speed, wired connection such as an Ethernet/802.3 100baseT compatible connection to each of the microcells 12-1 in order to carry wireless metropolitan area network (MAN) or mobile broadband wireless (MBW) network signals from the access points 14 back to an internetworking device such as a LAN router or hub 18. However, the invention uses especially adapted cable access points 14 and head end access points (HAPs) 16 in order to transport the wireless MAN or MBW network signals over the available transport media 15.

The head end access point (HAP) 16 couples the LAN signals between the available transport medium 15 and internetworking equipment such as a LAN router or hub 18. From the LAN hub 18, the signals may then be fed through LAN switches 20 to wired LANs 22, through routers 22 to corporate networks 26 or public backbone Internet connections 28, or to other internetworking equipment.

Figure 2:
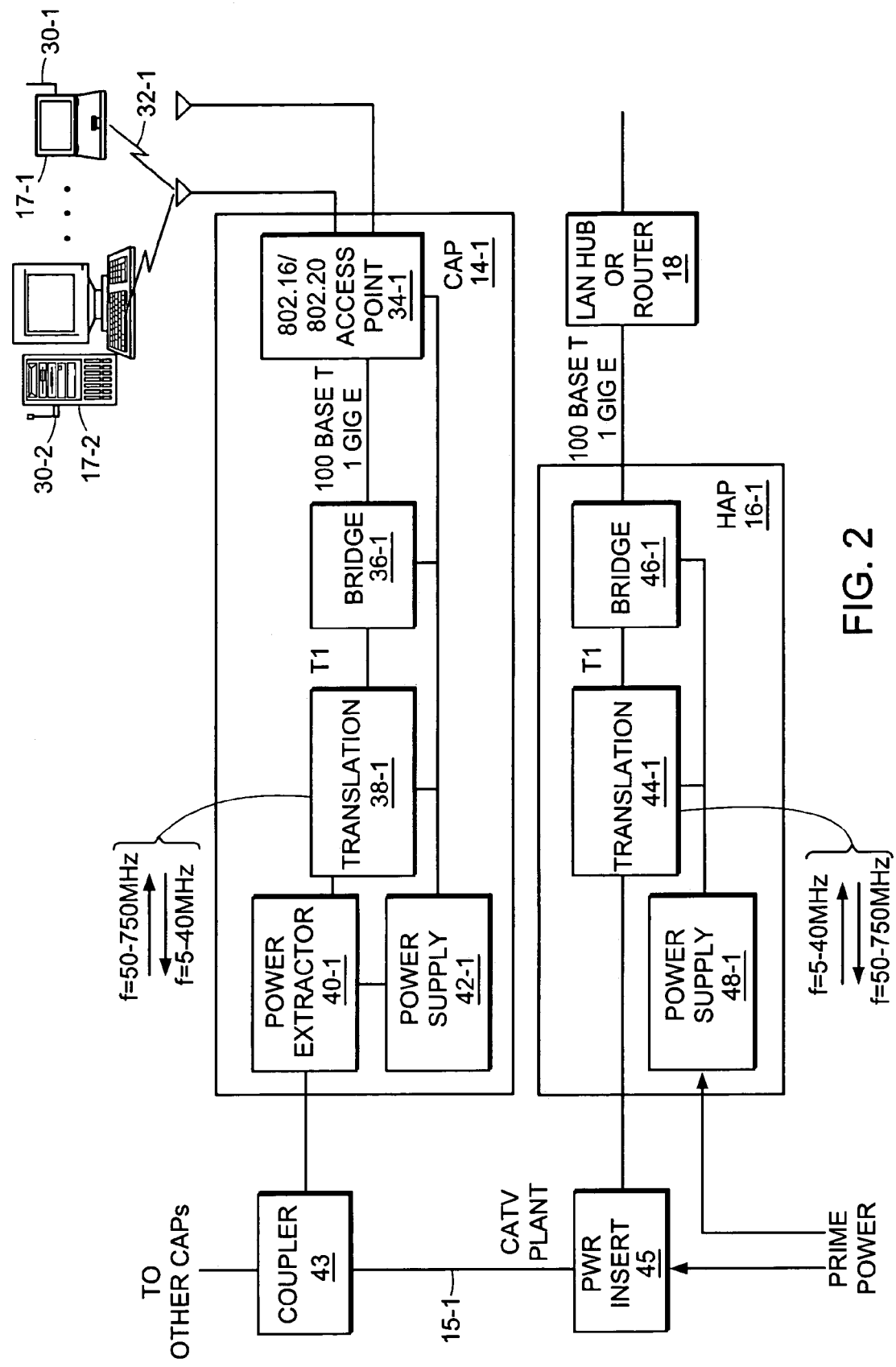
FIG. 2 is a more detailed block diagram of a cable access point and head end access point making use of a cable television transport media.

FIG. 2 is a more detailed diagram of a CAP 14-1 and HAP 16-1 that make use of existing CATV plant transport medium 15-1. The CAP 14-1 includes an access point 34-1, a remote bridge 36-1, a radio frequency (RF) translator 38-1, power extractor 40-1 and power supply 42-1. Although only a single CAP 14-1 is shown connected to the CATV plant 15-1, it should be understood that other CAPs 14 are similarly connected to the HAP 16-1.

The CAP 14-1 receives wireless MAN or MBW signals from computing equipment 17-1 and 17-2 located within its respective microcell 12-1. For example, mobile computing equipment 17-1 such as a laptop computer or personal digital assistant (PDA) may be fitted with a wireless MAN or MBW adapter 30-1 which transmits and receives wireless MAN or MBW signals 32-1 to and from a wireless MAN or MBW access point 34-1. It should be understood that in addition to the portable type computing equipment 17-1, there may also be desktop computers 17-2 located within the microcell 12, equipped with wireless MAN or MBW adapters 30-2.

The following discussion considers the path of a reverse link direction signal that is traveling from the computer 17 towards the LAN hub 18. However, it should be understood that communication paths in a network are full duplex and therefore must travel in both directions; the analogous inverse operations are therefore carried out in the forward link direction.

The radio signals transmitted by the wireless MAN or MBW adapter 30-1 and the wireless access point 34-1 are preferably in accordance with the known standardized signaling format such as the Institute of Electrical and Electronic Engineers (IEEE) 802.16 wireless MAN standard or 802.20 mobile broadband wireless standard. The access point 34-1 and wireless MAN or MBW adapter 30-1 are therefore available as inexpensive, off-the-shelf items.

The network side port of the access point 34-1 is, in the preferred embodiment, most commonly provided as a standardized Ethernet type signal compatible with 100baseT standard signaling. The remote bridge 36-1 thus converts the Ethernet signals provided by the access point 34-1 to a format suitable for connecting such signals over long distances, depending upon the available transport medium 15.

In the case of the illustrated CATV plant 15-1, the bridge 36-1 modulates such signals to a standard line signaling formats such as T1/T3 carrier format. However, rather than bring the T1/T3 compatible telecommunication line signaling directly to the location of the CAP 14-1 in the microcell 12, the T1/T3 formatted signal is instead provided to a translator 38-1. The translator 38-1 up-converts the T1/T3 signal to an appropriate intermediate frequency (IF) carrier for coupling over the CATV plant 15-1. For example, the T1 or T3 signal may, in the reverse link direction, be upbanded to a carrier in the range of from 5-40 MHz. In the forward link direction, that is, signals being carried from the central LAN hub 18 towards the computers 17, the translator 38-1 receives signals on the intermediate frequency carrier in a range from 50-750 MHz and translates them down to a baseband T1 or T3 signaling format.

The power inserter 45 may be located at any point in the CATV plant 15-1, and inserts a suitable low frequency alternating current (AC) power signal. This signal energizes the power extractor 40-1 and power supply 42-1 to generate a direct current supply signal for the CAPs 14. A signal coupler 43 couples this AC power signal and the intermediate frequency signal energy from the translator 38-1 to the CATV plant 15-1, and vice versa.

The head end access point (HAP) 16-1 contains a power supply 48-1, translator 44-1, and remote bridge 46-1. The translator 44-1 provides the inverse function of the translator 38-1. That is, in the reverse link direction, it converts the T1/T3 formatted signals from the intermediate frequency carrier in a range of from 5-40 MHz back down to the baseband T1/T3 format.

In the forward link direction, the translator 44-1 accepts signals converted from the LAN hub 18 through the bridge 46-1, upbanding them onto a convenient carrier such as in the range of from 50-750 MHz for coupling over the CATV plant 15-1.

For more information concerning the details of a suitable translator 38-1 and 44-1, reference can be had to U.S. Pat. No. 6,192,216 that issued on Feb. 20, 2001, entitled "Remotely Controlled Gain Control of Transceiver Used to Interconnect Wireless Telephones to a Broadband Network," the entire contents of which are incorporated herein by reference.

The remote bridge 46-1 then reconverts the translated reverse link signals back to Ethernet compatible signals, such as 100baseT or Gigabit Ethernet ("GigE") signals, which may then be processed by the LAN hub 18 or other compatible internetworking devices.

It should be understood that the CATV plant 15-1 may be replaced by other types of broadband distribution networks which may be conveniently available within the area 11. The one consideration which cannot be altered is that the end-to-end propagation delays of the remoting medium must be considered to comply with the end-to-end delay criteria specified by the Ethernet/802.3 standard. For example, optical transport media may also be used in the place of the coaxial cable used for the CATV plant 15-1, such as described in U.S. Pat. No. 6,504,831 that issued on Jan. 7, 2003, entitled "Optical Simulcast Network with Centralized Call Processing," the entire contents of which are incorporated herein by reference.

Figure 3:
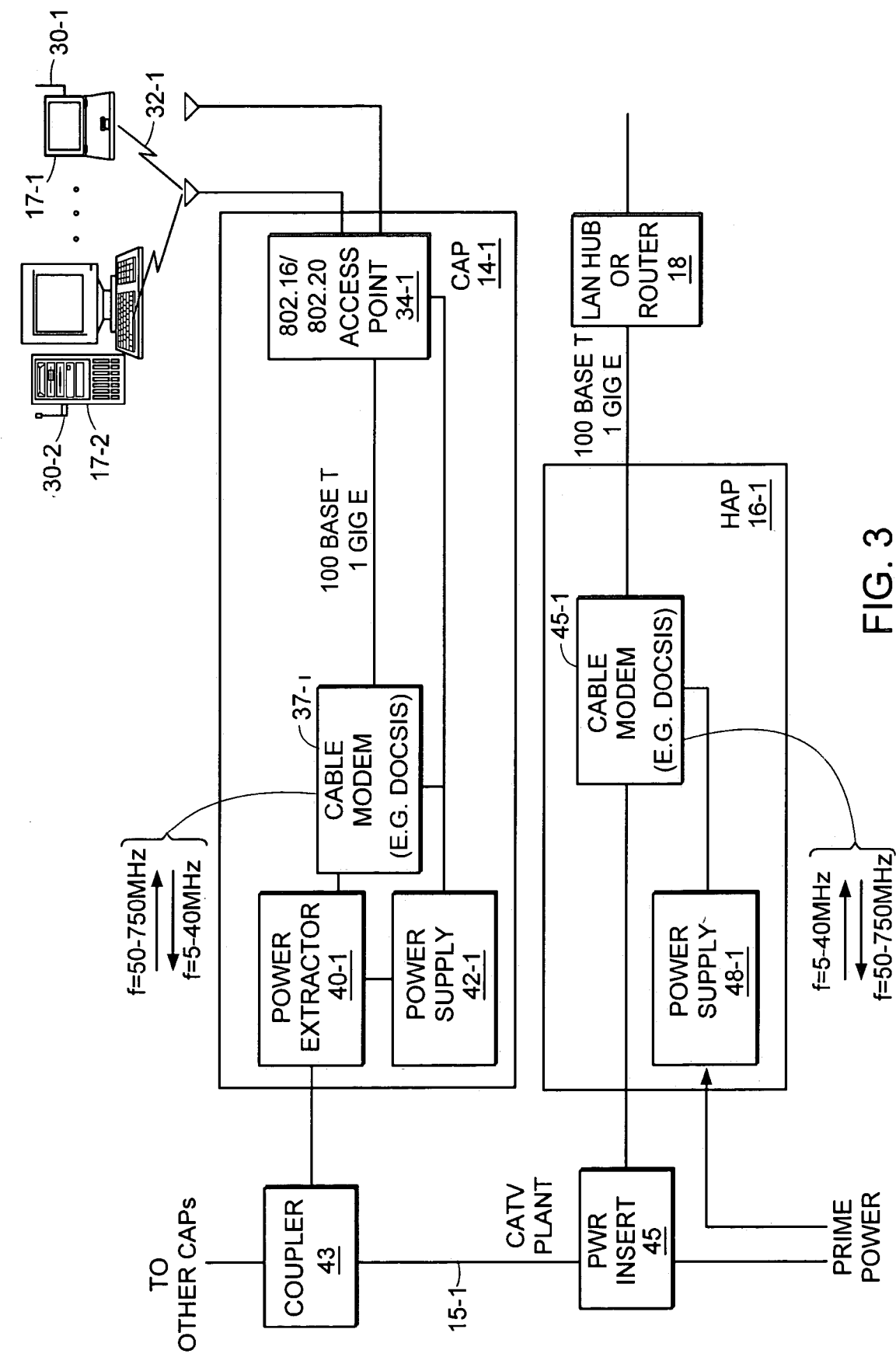
FIG. 3 is a block diagram of a cable access point and head end access point making use of a cable transport with Data Over Cable Service Interface Specification (DOCSIS) cable modem compatible interconnects.

FIG. 3 is a block diagram of an embodiment of the CAP 14 and HAP 16 using cable modem equipment. In this embodiment, a cable modem 37-1 replaces the bridge 36-1 and translator 38-1. The cable modem 37-1 may be IEEE 802.14, Multimedia Cable Network System (MCNS), or Data Over Cable Service Interface Specification (DOCSIS) compatible. The net result is the same in that the Ethernet signals used for communication with the access point 34-1 are converted to cable signals in the 5-750 MHz bandwidth.

Figure 4:
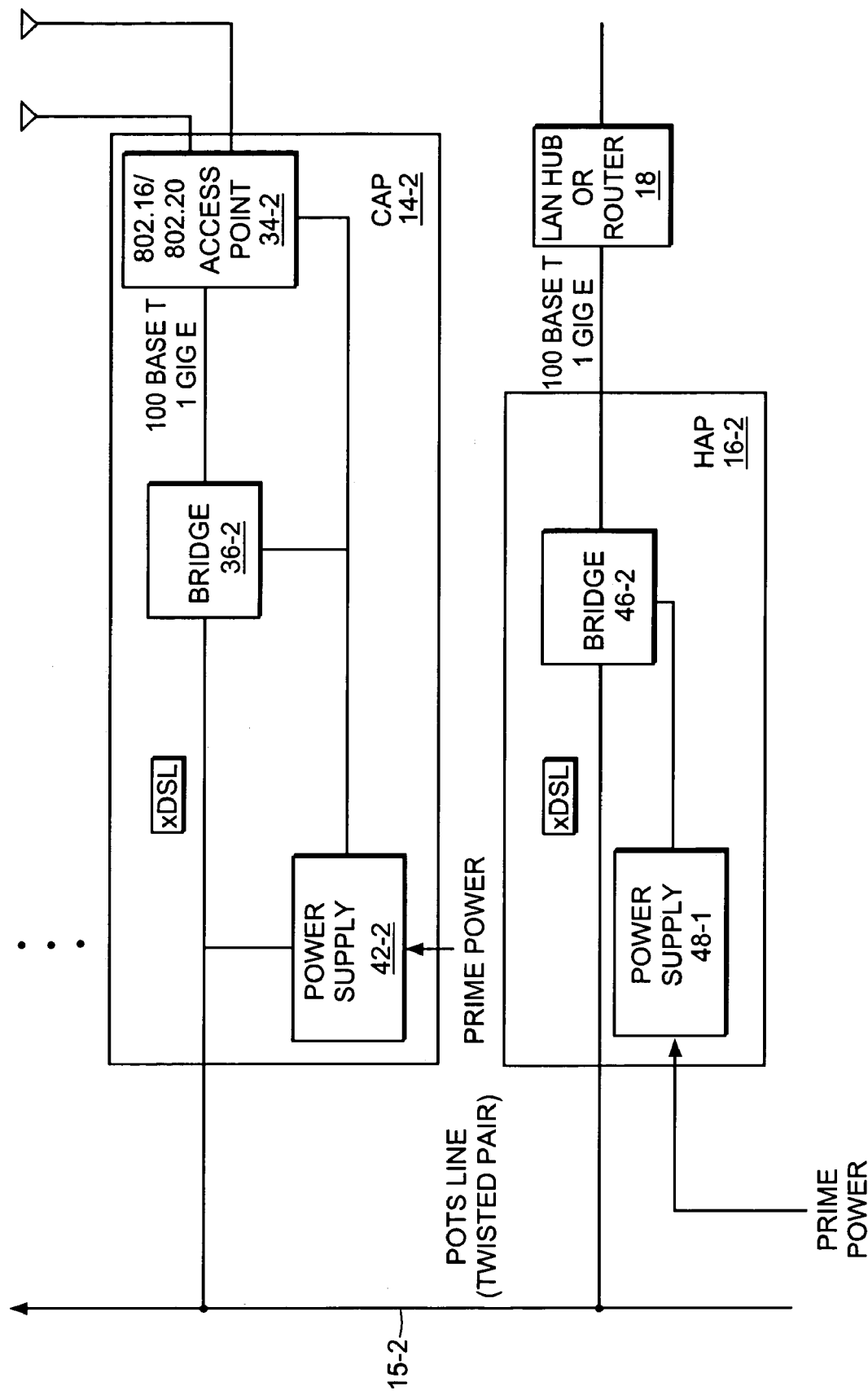
FIG. 4 is a block diagram of a cable access point and head end access point using a twisted pair transport media.

FIG. 4 illustrates an alternative embodiment of the CAP 14-2 and HAP 16-2 that uses twisted pair type transport medium 15-2. As before, a wireless MAN or MBW compatible access point 34-2 provides Ethernet/802.3 compatible signals to a remote bridge 36-2. In this instance, the remote bridge 36-2 provides a high speed digital output signal compatible with digital subscriber line (XDSL) signaling technology. Such xDSL technology uses sophisticated modulation schemes to pack data onto standard copper twisted pair wires.

Likewise, the bridge 46-2 disposed within the HAP 16-2 is compatible for converting xDSL signaling to Ethernet/802.3 signaling. The embodiment of FIG. 4 may typically be more advisable to use in areas 11 having readily available twisted pair copper wires such as used for carrying standard telephone signaling, and wherein such signaling requires only a short run to a local central telephone office of 20,000 feet shorter distance compatible with xDSL specifications.

The understanding therefore is that the bridge 36-1 or 36-2 and 46-1 or 46-2 may be any suitable type of layer two (L2) bridging to the appropriate available transport media 15-1 or 15-2, be it up-converted T1/T3 over cable or fiber, or xDSL.

Figure 5:
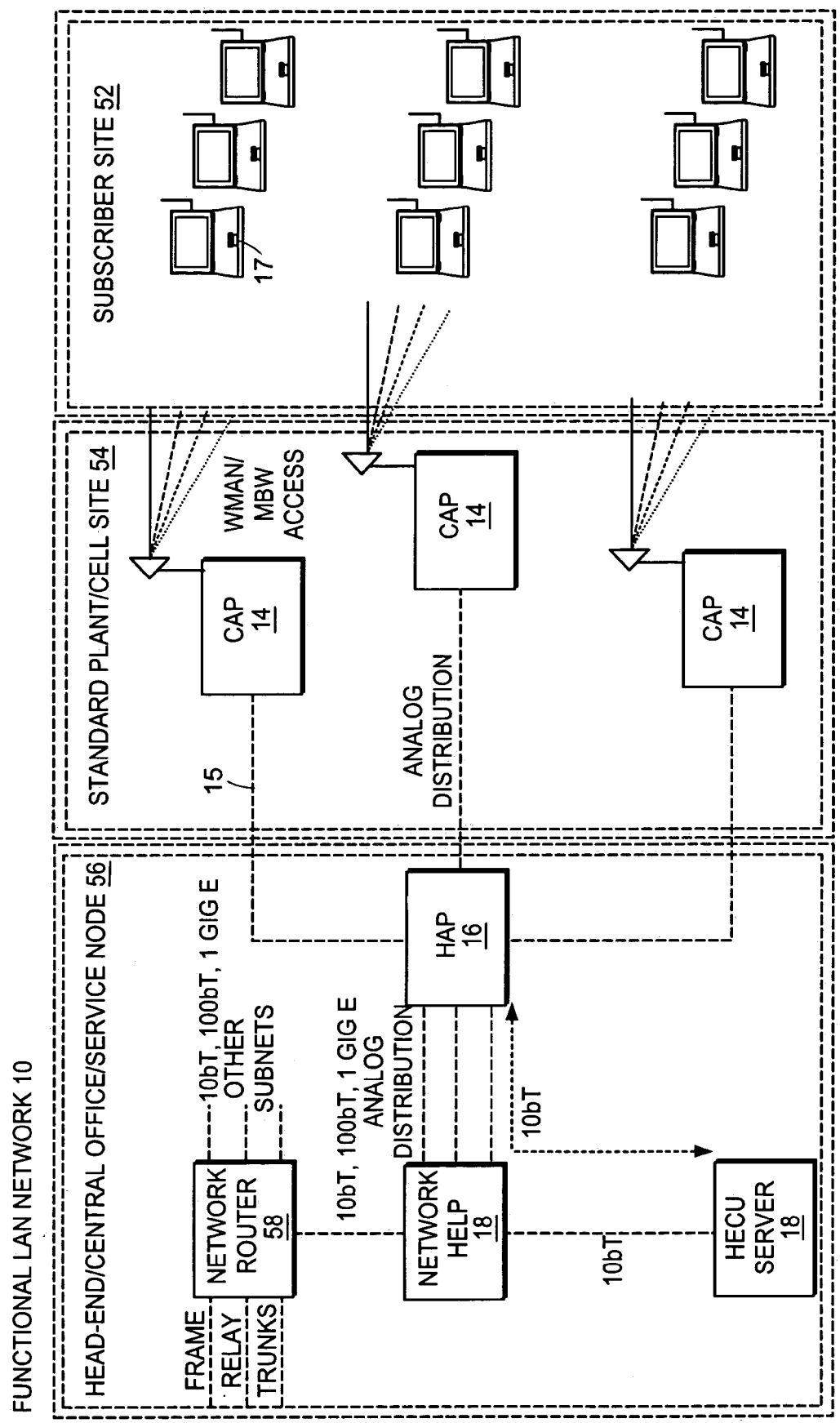
FIG. 5 is a more detailed diagram of the typical equipment deployed at the head end.

A complete implementation for a wireless data network 10 may thus be as shown in FIG. 5. In particular, the subscriber site 52 contains the remotely located computers 17. They exchange wireless MAN or MBW network signaling with devices located with the CAPs 14 located at the standard plant microcell sites 54. In turn, the CAPs 14 use an analog distribution network implemented using whatever transport medium 15 that is readily available. The HAP 16, which may itself use other analog distribution networks, converts such analog signals back to appropriate Ethernet/802.3 signal formatting and forwards them to the hub 18. The hub 18 thus provides local area network signals, such as compatible with the 100baseT standard, to network router 58. Router 58, in turn, may provide such signals to other networks over whatever long distance digital signaling is appropriate, such as to other local sub-networks over Ethernet/802.3 100baseT type signaling, or to other remote locations such as over frame relay trunks.

Figure 6:
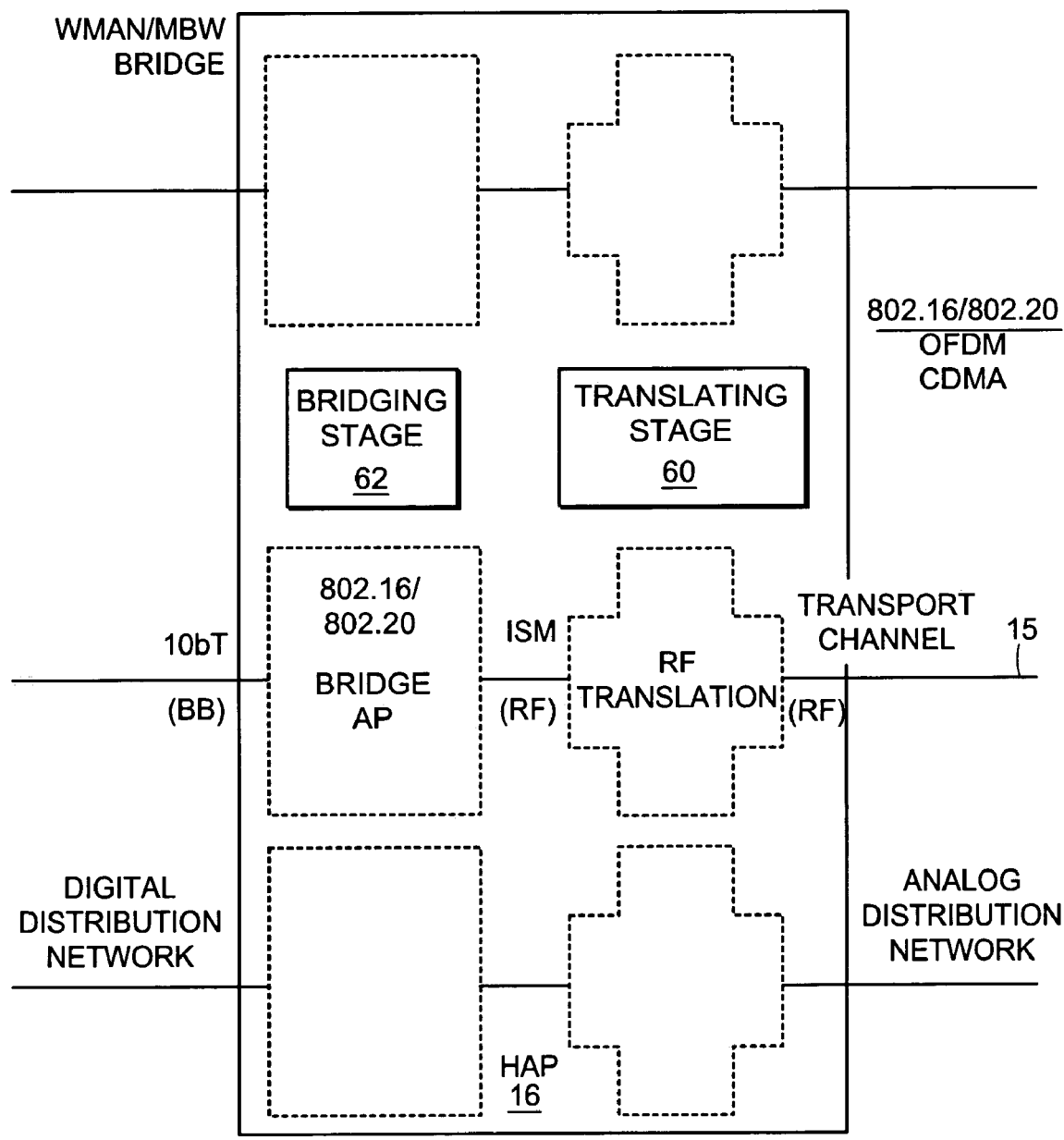
FIG. 6 is a more detailed diagram of the head end access point making use of a wireless metropolitan area network bridge and translation stage.

FIG. 6 is a detailed view of an alternate embodiment of the HAP 16. Here, the 802.16 or 802.20 air interface signal is translated in frequency to CATV transport frequencies between the HAP 16 and CAP 14. The HAP 16 consists generally of a translating stage 60 and bridging stage 62. A translating stage 60 provides a radio frequency translation function, accepting signals from the transport medium 15 and converting their radio band of operation. In this particular embodiment of the HAP 16, the bridging stage 62 is provided by an 802.16/802.20 compatible wireless bridge. This device accepts signals from a wireless metropolitan area network or a mobile broadband wireless network at baseband and converts them to the 802.16/802.20 protocol for frequency conversion by the translating stage 60. In this instance then, the translating stage 60 disposed between the bridging stage and the transport medium 15 converts the IF signaling used on the CATV transport medium 15 in the range of 5-750 MHz to the signaling in the appropriate RF band compatible with the 802.16/802.20 wireless bridging stage 62.

Figure 7:
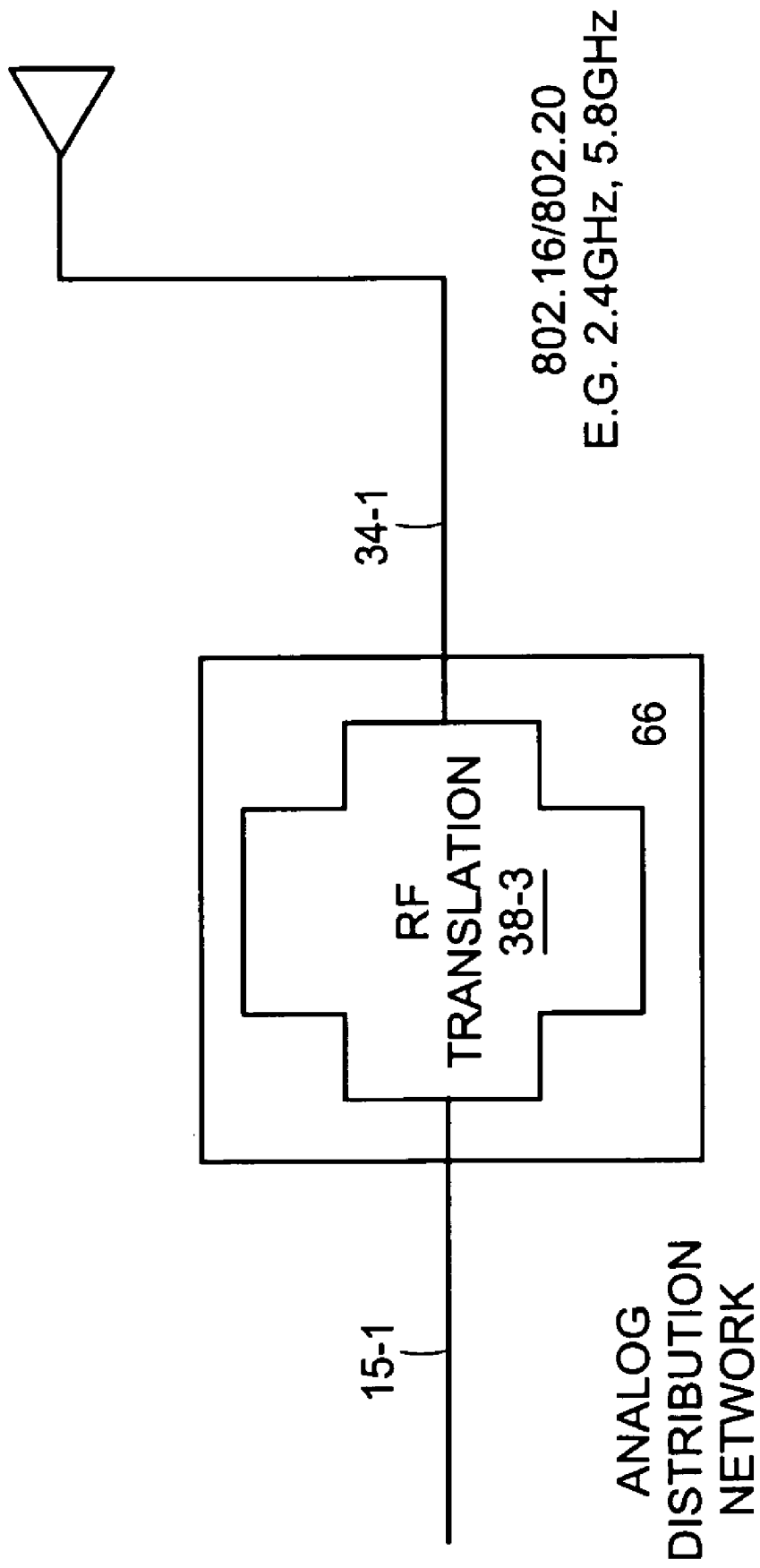
FIG. 7 is a more detailed block diagram of an alternative implementation of the cable access point.

Finally, FIG. 7 shows an alternate embodiment of the CAP 14 that uses a direct RF translator 38-3 to interface between the CATV transport medium 15 and the 802.16/802.20 format signals in the appropriate RF bands (e.g., 2.4 GHz or 5.8 GHz ISM bands). In particular, the analog distribution network signals in the 5-750 MHz band are translated in frequency up to an RF band carrier by the RF translator 38-3.

While this invention has been particularly shown and described with references to preferred embodiments thereof, it will be understood by those skilled in the art that various changes in form and details may be made therein without departing from the spirit and scope of the invention as defined by the appended claims.

What is claimed is:

1. A distribution network for coupling wireless metropolitan area network signals between an internetworking device and a plurality of remotely located access points, to provide wireless metropolitan area network service within a geographic coverage area composed of microcells, the distribution network making use of available transport cabling, comprising:
    (a) a plurality of cable access points, each deployed within a respective one of the microcells, the cable access points each further comprising:
        i) a wireless metropolitan area network access point, for receiving wireless metropolitan area network signals from computing equipment located within the respective microcell, and converting such signals to local area network compatible signals;
        ii) an access point remote converter, for receiving the local area network compatible signals from the wireless metropolitan area network access point and converting such signals to transport modulated format signals suitable for transmission over the available transport cabling; and
    (b) a head end access point, comprising:
        i) a head end remote bridge, connected to receive the transport modulated format signals from the transport cabling, and to convert such signals to local area network compatible signals.

2. A distribution network as in claim 1 wherein the available transport cabling is a cable television (CATV) plant and the cable access point additionally comprises:
    iii) a frequency translator, disposed between the access point remote bridge and the transport cabling, for frequency converting digital modulated transport signals produced by the access point remote bridge to a carrier frequency compatible with the CATV plant.

3. A distribution network as in claim 2 wherein the cable access point additionally comprises:
    iv) a frequency translator that downconverts the wireless metropolitan area network signals used within the respective microcells to the carrier frequency signals compatible with the CATV plant.

4. A distribution network as in claim 1 wherein the head end remote bridge additionally comprises:
    v) a head end frequency translator, for translating the carrier frequency signals compatible with the CATV plant to wireless metropolitan area network transmission band signals; and
    vi) a wireless metropolitan area network bridge, for receiving the wireless metropolitan area network transmission band signals and converting them to local area network signals for coupling to the internetworking device.

5. A distribution network as in claim 1 wherein the available analog transport cabling is a twisted pair telephone cabling and the access point remote bridge additionally converts the local area network signals to a digital subscriber line (xDSL) format.

6. A distribution network as in claim 1 wherein the cable access point and head end access point use a cable modem to perform the transport modulation, conversion, and bridging functions.

7. A distribution network as in claim 6 wherein the cable modem is compliant with a cable modem standard selected from the group density of IEEE 802.14, MCNS, or DOCSIS.

8. A distribution network as in claim 1 additionally comprising a local area network hub, for receiving the local area network compatible signals from the head end remote bridge, and forwarding such signals to the internetworking device.

9. A distribution network as in claim 1 wherein the transport cabling is an analog signal transport medium.

10. A distribution network as in claim 1 wherein the wireless metropolitan area network signals are compliant with Institute of Electrical and Electronic Engineers (IEEE) 802.16 standard.

11. A distribution network for coupling mobile broadband wireless network signals (e.g. IEEE 802.20) between an internetworking device and a plurality of remotely located access points, to provide mobile broadband wireless service within a geographic coverage area composed of microcells, the distribution network making use of available transport cabling, comprising:
    (a) a plurality of cable access points, each deployed within a respective one of the microcells, the cable access points each further comprising:
        i) a broadband mobile wireless network access point, for receiving mobile broadband wireless network signals from computing equipment located within the respective microcell, and converting such signals to local area network compatible signals;
        ii) an access point remote converter, for receiving the local area network compatible signals from the mobile broadband wireless network access point and converting such signals to transport modulated format signals suitable for transmission over the available transport cabling; and (b) a head end access point, comprising:

i) a head end remote bridge, connected to receive the transport modulated format signals from the transport cabling, and to convert such signals to local area network compatible signals.

12. A distribution network as in claim 11 wherein the available transport cabling is a cable television (CATV) plant and the cable access point additionally comprises:

iii) a frequency translator, disposed between the access point remote bridge and the transport cabling, for frequency converting digital modulated transport signals produced by the access point remote bridge to a carrier frequency compatible with the CATV plant.

13. A distribution network as in claim 12 wherein the cable access point additionally comprises:

iv) a frequency translator that downconverts the mobile broadband wireless network signals used within the respective microcells to the carrier frequency signals compatible with the CATV plant.

14. A distribution network as in claim 11 wherein the head end remote bridge additionally comprises:

v) a head end frequency translator, for translating the carrier frequency signals compatible with the CATV plant to mobile broadband wireless network transmission band signals; and vi) a mobile broadband wireless network bridge, for receiving the mobile broadband wireless network transmission band signals and converting them to local area network signals for coupling to the internetworking device.

15. A distribution network as in claim 11 wherein the available analog transport cabling is a twisted pair telephone cabling and the access point remote bridge additionally converts the local area network signals to a digital subscriber line (xDSL) format.

16. A distribution network as in claim 11 wherein the cable access point and head end access point use a cable modem to perform the transport modulation, conversion, and bridging functions.

17. A distribution network as in claim 16 wherein the cable modem is compliant with a cable modem standard selected from the group density of IEEE 802.14, MCNS, or DOCSIS.

18. A distribution network as in claim 11 additionally comprising a local area network hub, for receiving the local area network compatible signals from the head end remote bridge, and forwarding such signals to the internetworking device.

19. A distribution network as in claim 11 wherein the transport cabling is an analog signal transport medium.

20. A distribution network as in claim 11 wherein the mobile broadband wireless network signals are compliant with Institute of Electrical and Electronic Engineers (IEEE) 802.20 standard.

* * * * *